Dec. 21, 1965　　　JAMES E. WEBB　　　3,224,173
ADMINISTRATOR OF THE NATIONAL AERONAUTICS
AND SPACE ADMINISTRATION
LIQUID-GAS SEPARATION SYSTEM
Filed Dec. 31, 1964

William T. Prescott
INVENTOR.

BY
ATTORNEYS

United States Patent Office 3,224,173
Patented Dec. 21, 1965

3,224,173
LIQUID-GAS SEPARATION SYSTEM
James E. Webb, Administrator of the National Aeronautics and Space Administration, with respect to an invention of William A. Prescott, 7703 E. 112th St., Kansas City, Mo.
Filed Dec. 31, 1964, Ser. No. 422,867
4 Claims. (Cl. 55—408)

The invention described herein may be manufactured and used by or for the government of the United States of America for governmental purposes without the payment of any royalty thereon or therefor.

This invention relates to a system for removing liquid from a gas stream with which the liquid is mixed, and is particularly adapted for operation in a gravity free environment.

In fluid circulating systems which are required to operate under zero gravity conditions such as the environmental control systems for astronauts or liquid-gas circulating systems in fuel cell power supplies for spacecraft, the separation of liquid from a liquid-gas stream is a usual operational requirement. The separated liquid is generally stored in a closed container and for space saving reasons and other reasons compatible with the use of the liquid it is usually desirable that only liquid be removed from the mixture. In addition, where a liquid separator is located in a conduit which carries a liquid-gas mixture, it is important for efficiency of operation that only a part of the liquid accumulating in the separator be removed.

The liquid-gas separator of this invention is particularly adapted to the extracting of liquid from a liquid-gas stream in a zero-gravity environment. Such liquid removal systems have been previously developed, one such being disclosed in a co-pending application of Kenneth E. Stroup et al., #176,504, filed February 28, 1964 for a Self-Regulating Liquid Removal System. These prior art systems, however, have not been entirely satisfactory in effecting the separation of only pure liquid from the mixture. The present invention includes a positive action valve means for insuring the removal of only liquid from the mixture. The system includes a separator of the centrifugal type whereby the liquid in a liquid-gas mixture, when introduced into the separator, is disposed by centrifugal force in an annular pool against the walls of the rotating bowl of the separator. The liquid collecting in the annular pool in the separator is removed through a pair of collector tubes which are positioned in fixed relation within the separator and by means of an automatically operating piston valve are placed in fluid communication with the liquid outlet tube whenever the liquid in the separator exceeds a predetermined amount.

The pair of collector tubes extend radially from a cylinder which houses the piston valve and is located coaxially with the rotary axis of the separator. The outer ends of the radial tubes are located close to the inner wall of the separator and oriented to face the rotating liquid whereby liquid in the pool will be carried into the tube ends. However, one tube end is disposed at a greater distance from the rotary axis of the separator than the other, whereby it receives liquid at a higher velocity and is subjected to higher total pressure. The liquid flows from the tube subjected to higher total pressure into the cylinder which houses the piston valve. When the piston valve in the cylinder is in its normally closed spring-biased position where it closes off the liquid outlet tube, liquid flows from the cylinder which houses the piston valve and out the other collector tube and is returned to the pool.

For opening the piston valve a Venturi tube is provided in fixed position adjacent the inner wall of the separator, but at a lesser radial distance from the rotary axis of the separator than at least one of the tube ends of the collector tubes. The Venturi tube is disposed with its axis tangential to the annular pool whereby as the quantity of liquid in the centrifugal separator increases to where liquid flows through the Venturi tube, a pressure drop is created in the Venturi port which is communicated to the cylinder on the side of the piston valve engaged by the biasing spring by means of a connecting conduit. The pressure reduction induced in the cylinder thus reduces the effect of the valve spring and opens the valve to the liquid outlet, thereby draining liquid from the separator. As the liquid level recedes in the separator so that the Venturi tube is no longer submerged therein, the spring closes the piston valve and liquid flow from the separator ceases.

Other objects and many of the attendant advantages of this invention will be readily appreciated as the same become better understood by reference to the following detailed description when considered in connection with the accompanying drawings in which like reference numerals designate like parts throughout the figures thereof and wherein.

Figure 1:
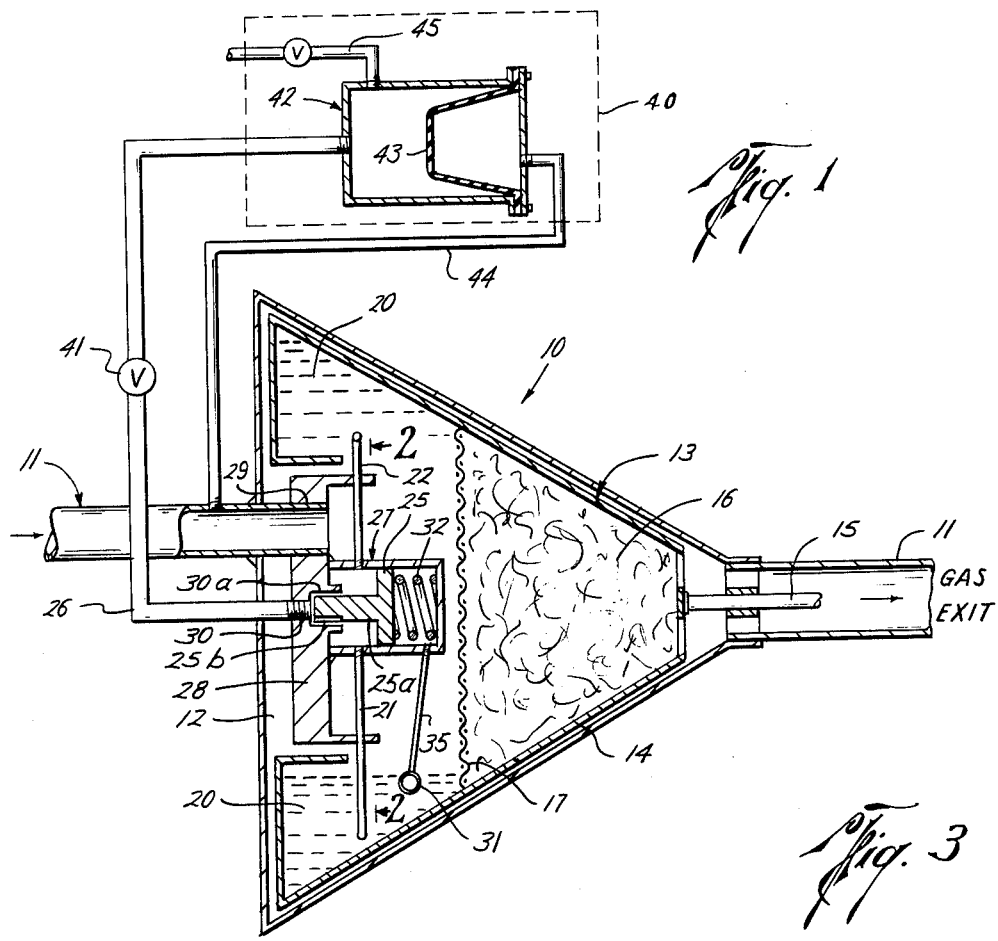
FIG. 1 is a schematic view partly in section of the liquid removal system of this invention.
Figure 2:
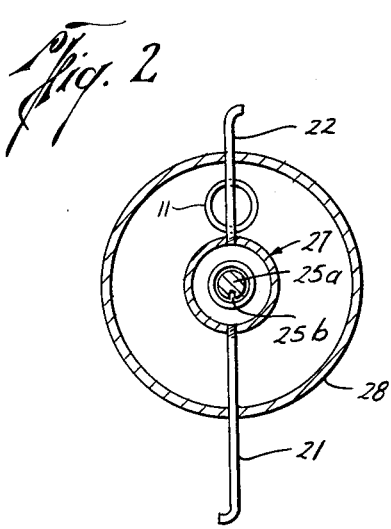
FIG. 2 is a schematic view of the collector tubes which are adapted to pump liquid from the centrifugal separator in the invention.
Figure 3:
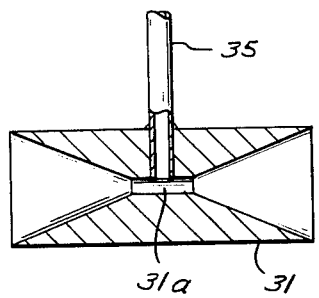
FIG. 3 is a schematic view showing the Venturi tube which is disposed in fixed position in the centrifugal separator.

Referring more particularly to FIG. 1 of the drawing, there is shown a liquid removal device 10 which is installed to remove liquid from a conduit 11 carrying a mixture of gas and liquid. Positioned within an enlargement 12 of the conduit 11 is a centrifugal separator 13 which is supported within the enlargement on a shaft 15 which is suitably driven by means not shown, to spin the separator at a high speed. The separator comprises a bowl 14 in the form of a frustrum of a cone which is rotatable by the shaft 15 and is filled in part with a wire mesh material 16 on which the liquid from the stream of gas and liquid will collect. A wire screen 17 extending transversely of the conical bowl 14 holds the mesh in the cone. The enlargement 12 of the gas liquid conduit is desirably also of frusto-conical shape corresponding to the shape of the centrifugal separator and disposed in coaxial relation therewith with little clearance between the two. As the separator rotates, the liquid collecting on the wire mesh is carried by centrifugal force to form an annular pool 20 of liquid at the largest diameter of the separator.

The liquid collecting in the annular pool in the separator is removed through a pair of collector tubes 21 and 22 which are positioned in fixed relation within the separator and by means of an automatically operating piston valve 25 (to be hereinafter described) are placed in fluid communication with a liquid outlet tube 26 whenever the liquid in the separator exceeds a pre-determined value. The pair of collector tubes extend radially from a cylinder 27 which houses the valve element and is located coaxially with the rotary axis of the separator. The cylinder is attached at one end to a disc-shaped base member 28 which also supports the conduit 11 which passes through an opening 29 provided in the disc. The liquid outlet tube 26 also passes through a bore 30 in the center of the disc whereby it is adapted to fluidly communicate with the cylinder 27 by action of the piston 25. The piston 25 includes an axial extension 25a which normally seats in an enlargement 30a of the bore 30 in the disc member to close off the liquid outlet tube. A coiled spring 32 disposed in the cylinder to the right of the piston abuts the cylinder head and the piston to bias the piston to its normally closed position.

The pair of collector tubes 21 and 22 extend radially from the cylinder which houses the piston valve with the outer ends of the tubes located close to the inner wall of the separator and oriented to face the rotating liquid, whereby liquid in the pool will be carried into the tube ends. However, the end of the tube 21 is disposed at a greater distance from the axis of the separator than is the end of the tube 22 whereby it receives liquid at a higher velocity and is subjected to higher total pressure, and liquid is pumped from the annular pool through the tube 21 and into the cylinder 27. When the valve piston in the cylinder is in its normally closed spring-biased position where it closes off the liquid outlet tube, liquid flows from the annular pool into the collector tube 21 into the cylinder 27 and out through the tube 22, and is thereby returned to the pool.

For opening the piston valve, a Venturi tube 31 is provided in fixed position adjacent to the inner wall of the separator, but at a lesser radial distance than at least one of the tube ends of the collector tubes. The Venturi tube is disposed with its axis tangential to the annular pool whereby, as the quantity of liquid in the separator increases to where the liquid flows through the Venturi tube, reduced pressure is produced in the restricted throat 31a of the tube. This pressure is communicated to the cylinder 27 on the side of the piston valve engaged by the bias spring means through a connecting conduit 35. The conduit 35 opens into the Venturi tube at the restricted throat thereof, and opens into the cylinder 27 near the end thereof which includes the biasing spring. It will therefore be apparent that as the pressure reduction produced in the Venturi tube is introduced to the cylinder this reduces the effect of the valve spring, and the valve is forced away from its valve seat by the static pressure of liquid flowing through the cylinder from the collector tube 21. The unseating of the valve 25 opens the outlet to the conduit 26 and liquid is thereby forced from the separator by the static pressure difference between the liquid in the cylinder and in the conduit 26. The piston includes a groove restriction 25b in the side of the extension 25a to serve as an orifice restriction to limit the rate of liquid flow such that the said pressure required to overcome the bias spring means to unseat the valve 25 also is the pressure within the cylinder required to force that rate of liquid flow through the groove 25b. As the liquid level recedes in the separator so that the Venturi tube is no longer submerged therein, the conduit 35, also the side of the piston valve engaged by the bias spring means, is subjected to the gas pressure, whereby the developed force and the spring closes the piston valve and liquid flow from the separator ceases.

The liquid outlet conduit 26 may lead to a suitable storage means 40 with a check valve 41 installed in the conduit 26 to prevent back flow from the tank. The storage means may include a conventional accumulator 42 with a transverse diaphragm 43 therein which is exposed on one side to the liquid to be stored, and is exposed on the other side to the liquid-gas mix entering the tank through a conduit 44 which leads from the conduit 11. In this way the pumping device pumps only against the gas pressure existing the duct. A suitable drain 45 may be provided for the storage tank. This type of discharge and storage means for receiving liquid from the outlet conduit 26 is illustrative only, since other suitable storage means might be employed.

It will therefore be apparent that a liquid removal system of the character described herein functions for pumping the liquid only when there is a necessity for liquid to be pumped, and is accordingly self-regulating. Control devices are therefore unnecessary and the separation of liquid occurs in response to the accumulation of a predetermined quantity of liquid within the centrifugal separator. The location of the Venturi tube, of course, can be made radially adjustable to adjust the automatic operation of the system in response to different desired accumulation levels of liquid in the separator. The operation of the valve means, which opens only when the cylinder chamber to the left of the piston in the drawing is filled with liquid, insures only liquid flow from the separator.

While in the embodiment of the invention shown herein both tube ends of the radial collector tubes face the ram effect of the liquid, the tube end of the shorter tube could be turned away so as not to receive the velocity energy of the rotating liquid. A greater flow of liquid into the cylinder could therefore be effected as desired. The liquid flow and pressure exerted against the piston on the liquid side of the piston can also be adjusted by varying the diameters of the collector tubes or providing restriction means therein, and varying restriction in flow path to outlet.

It should be understood that the foregoing disclosure relates only to preferred embodiments of the invention and that it is intended to cover all changes and modifications of the examples in the invention herein chosen for the purposes of the disclosure which do not constitute departures from the spirit and scope of the invention.

What is claimed and desired to be secured by Letters Patent is:

1. A centrifugal separator for removing liquid from a liquid-gas stream, said separator comprising:

a hollow, generally frusto-conical element mounted in a conduit conveying a liquid-gas stream for rotation about its axis of generation, said hollow element having an outlet at its smaller end and an imperforate inwardly directed flange circumferentially engaging its larger end and defining an inlet to said hollow element for the liquid-gas stream, said larger end of the hollow element and the flange defining an annulus for the collection of liquid;

a porous mass disposed within said hollow element and interposed in the liquid-gas stream to completely cover said outlet, whereby the mixed fluids to be separated pass into said porous mass and liquid is collected thereon, said liquid being disposable by centrifugal action to the annulus at the larger end of the hollow element;

a hollow cylindrical chamber member having an outlet at one end thereof;

means for supporting said cylindrical chamber member in fixed relationship to said generally frusto-conical element;

a piston means slidably mounted in said cylindrical chamber member and dividing said cylindrical member into an outlet chamber fluidly communicating with said cylinder outlet and an actuation chamber;

a spring means disposed within said actuation chamber and biasing said piston to a position where it closes off said outlet;

a pair of tubes having open ends at different radial distances from the rotary axis of the separator with each said open end extending into said annulus and at least the tube end which is most radially distant from the rotary axis extending tangential to the annulus and being open in a direction opposite to the motion of the liquid as the separator rotates, said tubes being in fluid communication at their other ends with the outlet chamber side of said cylinder member whereby liquid is pumped from said annulus into said cylinder member whenever at least one of said tube ends is submerged within liquid collected in said annulus;

a Venturi tube disposed within the annulus of the frusto-conical chamber with the bore of the Venturi tube extending tangential to said annulus, said Venturi tube having a restricted orifice and being located at a lesser radial distance from the rotary axis of the separator than the open end of at least one of said tubes; and a conduit fluidly communicating the restricted orifice of the Venturi tube with the actuation chamber of said cylinder member whereby a pressure reduction produced in the restricted orifice of the Venturi tube by liquid flowing therethrough is introduced to the actuation chamber of the cylinder member to reduce the bias effect of the spring means and fluid pressure in said outlet chamber moves the piston valve from its position wherein the cylinder outlet is closed to a second position wherein the cylinder outlet is open to permit flow of liquid from the annulus of the separator through said cylinder member outlet.

2. A centrifugal separator as described in claim 1 wherein the porous mass disposed within the generally frusto-conical element is a body of open mesh wire.

3. A centrifugal separator for removing liquid from a liquid-gas stream, said separator comprising:

a hollow member defining a generally frusto-conical chamber and being mounted for rotation about the axis of generation of said chamber, said hollow member having an outlet at the smaller end of said chamber and an inlet at the larger end of said chamber adapted to be fluidly communicated with a conduit conveying a stream of gas with liquid entrained therein, said inlet being formed interiorly of the periphery of the larger end of said chamber whereby the larger end of said chamber defines an annulus for the collection of liquid;

a porous mass disposed within said hollow element to cover said outlet and peripherally engage the frusto-conical surface whereby a liquid-gas stream communicated to the inlet of said separator passes into said porous mass and liquid is collected thereon, said liquid being disposable by centrifugal action to said annulus;

a hollow cylinder member having an outlet at one end thereof;

means for supporting said hollow cylinder member in fixed relationship to said generally frusto-conical chamber member;

a piston means slidably mounted in said hollow cylinder member and dividing said cylinder member into an actuation chamber and an outlet chamber, said outlet chamber fluidly communicating with said cylinder outlet;

a spring means disposed within said actuation chamber and biasing said piston to a position where it closes off said cylinder outlet;

a pair of tubes having open ends at different radial distances from the rotary axis of the separator with each said open end extending into said annulus and at least the tube end which is most radially distant from the rotary axis extending tangential to the annulus and open in a direction opposite to the motion of the liquid as the separator rotates, said tubes being in fluid communication at their other ends with said outlet chamber whereby liquid is pumped from said annulus into said outlet chamber whenever at least one of said tube ends is submerged within liquid in said annulus;

a Venturi tube disposed within the annulus of the frusto-conical chamber with the bore of the Venturi tube extending tangential to said annulus, said Venturi tube having a restricted orifice in the bore thereof and being located at a lesser radial distance from the rotary axis of the separator than the open end of at least one of said tubes which extends into the annulus;

a conduit fluidly communicating the restricted orifice of the Venturi tube with said actuation chamber whereby a pressure reduction produced in the restricted orifice of the Venturi tube by liquid flowing therethrough is introduced to said actuation chamber to reduce the bias effect of the spring means and the fluid pressure in said outlet chamber moves the piston valve to open said cylinder outlet to permit flow of liquid from the annulus of the separator through said cylinder outlet; and means for limiting the rate of liquid flow from said outlet chamber whereby the fluid pressure which unseats said piston valve is the pressure which determines the rate of liquid flow from said outlet chamber.

4. The combination of a duct having an enlargement therein, said duct having a longitudinal axis, said enlargement containing a rotary centrifugal separator means for removal of liquid entrained in gas flowing in said duct, said separator means including an open-ended hollow rotary frusto-conical element, said element being coaxially and rotatably mounted in said duct enlargement; an inwardly extending circular flange attached to the larger end of said element, said flange and said element defining an annular space within said element at the large end of said element for the collection of liquid, a porous mass disposed within said element adjacent its smaller end, said mass peripherally engaging the interior surface of said element whereby the gas with entrained liquid flowing into said element must pass through said mass and the liquid collected therein is carried by centrifugal force into the annular space as the element rotates; means for removing liquid from the annular space including a fixed tube having an outlet portion coaxial with said duct, said outlet portion being disposed within the larger end of said element, said tube having a first arm fluidly communicating said outlet portion with said annular space, said tube having a second arm fluidly communicating said outlet portion with said annular space, said first arm having one end more radially distant from the rotary axis of the separator than said second arm, and said first and second arms having inlet portions extending tangential to said annular space and in a direction opposite to the direction of rotation of said frusto-conical element; a liquid outlet conduit coaxial with said duct, means responsive to the accumulation of a predetermined amount of liquid in said annular space for establishing fluid communication between said outlet portion of said tube and said liquid outlet conduit whenever the quantity of liquid in said annular space exceeds said predetermined amount, said latter means including said outlet portion which is a hollow cylinder closed at both ends, said hollow cylinder being coaxial with said duct and in fluid communication with said liquid outlet conduit and with said first and second arms; valve means in said cylinder for opening and closing said liquid outlet conduit, said valve means including a piston dividing said cylinder into an outlet chamber and an actuation chamber; spring means in said actuating chamber biasing said piston to a position where said piston closes off said liquid outlet conduit; a third tube fluidly communicating said actuation chamber with said annular space, said third tube being longer than at least one of said tube arms; a Venturi tube having a throat and an inlet and outlet to said throat, said Venturi tube disposed tangential to said annular space with the inlet to said Venturi tube disposed in a direction opposite to the direction of rotation of said frusto-conical element, said third tube connected to and fluidly communicating with the throat of said Venturi tube whereby a pressure reduction produced in the throat of said Venturi tube by liquid flowing therethrough is introduced to said actuating chamber to reduce the bias effect of said spring means and said piston valve is moved to a position to open said liquid outlet conduit to permit flow of liquid from said annular space to said liquid outlet conduit; and means for limiting the rate of liquid flow from said outlet chamber to said liquid outlet conduit, to maintain the pressure of liquid acting against the piston at a level sufficient to maintain the piston valve in open position whenever liquid flows through said Venturi tube, said flow limiting means comprising a longitudinal groove means in the periphery of said cylindrical piston means to serve as an orifice restriction to limit the rate of liquid flow from said outlet chamber to said liquid outlet conduit, said groove means constructed and arranged so that the groove means fluidly communicates only said outlet chamber with said liquid outlet conduit when the piston is moved to open said outlet conduit.

References Cited by the Examiner

UNITED STATES PATENTS

| | | | |
|---|---|---|---|
| 165,785 | 7/1875 | Braun. | |
| 881,723 | 3/1908 | Scheibe | 233—29 X |
| 1,101,549 | 6/1914 | Hoffman | 233—20 |
| 1,232,464 | 7/1917 | Houghton | 55—407 |
| 1,580,380 | 4/1926 | MacDonald | 55—400 |
| 1,658,965 | 2/1928 | Bradshaw et al. | 137—502 X |
| 1,993,944 | 3/1935 | Peebles | 55—199 X |
| 2,192,589 | 3/1940 | Schmitz | 233—22 |
| 2,286,354 | 6/1942 | Fitzsimmons | 233—21 X |
| 2,519,971 | 8/1950 | Le Clair | 233—20 |
| 2,539,896 | 1/1951 | Dalrymple | 55—400 X |
| 2,559,917 | 7/1951 | Gresham | 233—20 |
| 2,575,315 | 11/1951 | Edwards | 55—199 X |
| 2,575,568 | 11/1951 | Topanelian | 55—199 X |
| 2,595,222 | 5/1952 | Bayuk et al. | 137—183 |
| 2,881,974 | 4/1959 | Ruf | 233—45 |
| 3,026,966 | 3/1962 | Asklof | 55—277 X |
| 3,104,964 | 9/1963 | Craft | 55—406 |
| 3,135,691 | 6/1964 | Hemfort | 233—22 X |

FOREIGN PATENTS

| | | |
|---|---|---|
| 211,288 | 9/1960 | Austria. |
| 866,777 | 2/1953 | Germany. |

HARRY B. THORNTON, *Primary Examiner.*